United States Patent [19]

Takeuchi

[11] Patent Number: 4,622,246
[45] Date of Patent: Nov. 11, 1986

[54] METHOD OF POLISHING A VEHICLE

[75] Inventor: Shigeo Takeuchi, Nagoya, Japan

[73] Assignee: Takeuchi Tekko Kabushiki Kaisha, Aichi, Japan

[21] Appl. No.: 568,687

[22] Filed: Jan. 6, 1984

[51] Int. Cl.⁴ .......................... B05D 3/00; B05D 3/12
[52] U.S. Cl. .................................. 427/327; 427/348; 427/354; 427/355; 427/388.1; 427/416
[58] Field of Search ............... 427/348, 354, 355, 379, 427/368, 327, 385.5, 416, 424, 429, 421, 388.1; 106/270, 271, 3; 15/53 A, 312 R, 405; 118/72, 73, DIG. 7

[56] References Cited

U.S. PATENT DOCUMENTS

| 2,032,744 | 3/1936 | Fessler et al. | 427/416 |
| 2,523,281 | 9/1950 | Currie | 106/3 |
| 3,336,622 | 8/1967 | Von Kullwitz et al. | 15/53 A |
| 3,590,417 | 7/1971 | Emanuel | 15/53 A |
| 3,601,833 | 8/1971 | Takeuchi | 15/53 A |
| 3,614,800 | 10/1971 | Takeuchi | 15/53 A |
| 3,626,536 | 12/1971 | Napoli | 15/53 A |
| 4,015,032 | 3/1977 | Hanna | 427/327 |
| 4,020,857 | 5/1977 | Rendemonti | 427/416 |
| 4,162,348 | 7/1979 | Juzu et al. | 427/327 |
| 4,247,330 | 1/1981 | Sanders | 106/3 |

FOREIGN PATENT DOCUMENTS 44-6349  3/1969  Japan ................... 427/327

Primary Examiner—Sadie L. Childs
Attorney, Agent, or Firm—Armstrong, Nikaido Marmelstein & Kubovcik

[57] ABSTRACT

A method of polishing a vehicle, using a portal traveling frame which straddles a vehicle to be polished and moves reciprocatingly, said portal traveling frame being provided thereon with rotative brushes, wax applicators, rinsing means and driers. In a first travel of the portal traveling frame, the vehicle is washed. In a second travel of the portal frame, a foamy wax of anionic active agent is applied to the vehicle. In a third travel of the portal frame, an aqueous wax of cationic active agent is applied to the vehicle which is subsequently rinsed. In a fourth travel of the portal frame, the vehicle is dried.

4 Claims, 10 Drawing Figures

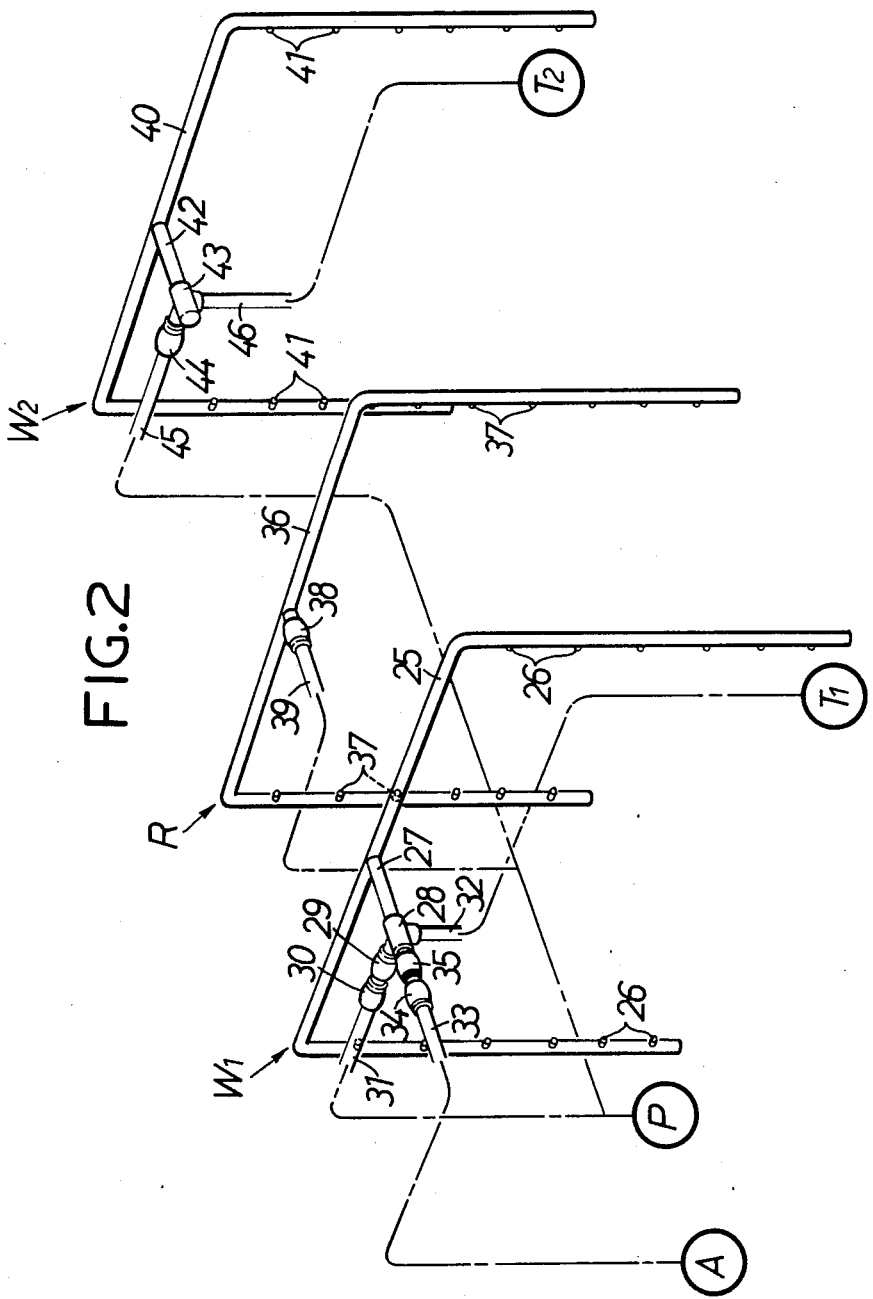

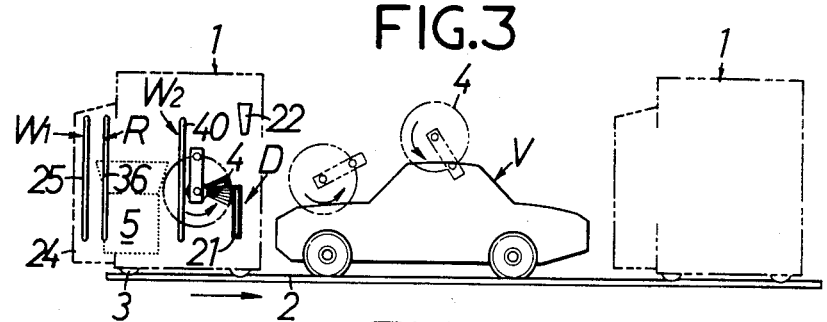
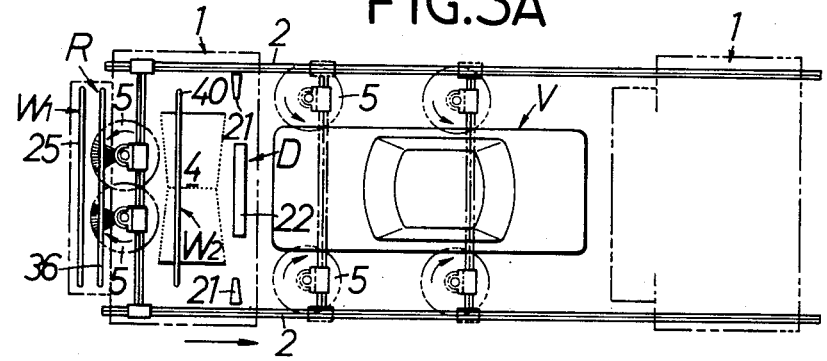
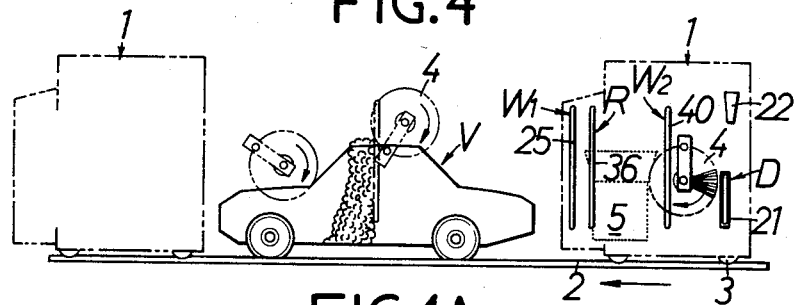
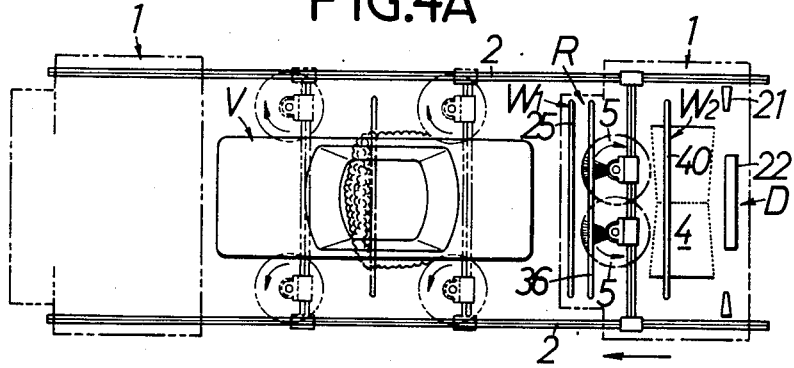

METHOD OF POLISHING A VEHICLE

TECHNICAL FIELD

The present invention relates to method of polishing a vehicle body, mainly passenger motorcar.

BACKGROUND ART

In a well-known method of polishing a vehicle body, there is provided a portal traveling frame which is designed so as to reciprotatingly move on guide rails, the portal traveling frame being provided thereon with washing means and drying means. In such arrangement, the portal traveling frame moves in straddling a vehicle body to be polished, meanwhile the washing means and drying means accomplishes washing and drying of the vehicle body. However, in such a customary method, polishing of the vehicle body can not be made, and lustrous gloss can not be made on the vehicle body after cleaning Hence, an apparatus wherein a polishing device is provided on the portal traveling frame has been proposed, as disclosed, for example, in Japanese Patent Publication No. 6349/1969. But in this apparatus, there was such defects that the construction is complex and of large type as a whole, and further it is high in cost and easy to break down, and inspection and adjustment are troublesome, etc., since a brush for applying wax, a brush for polishing and a brush for brush-cleaning were provided each independently.

SUMMARY OF THE INVENTION

The present invention has been proposed taking above defects into consideration. The present invention has for its object to provide such a polishing method that can resolve the customary defects, moreover it can apply a thick wax coating through the whole surface of the vehicle body evenly and securely after cleaning by performing such processes continuously as cleaning of the vehicle body, first polishing by foamy wax, second polishing and rinsing by aqueous wax and drying during the portal traveling frame travels back and forth in straddling the vehicle. The present invention is characterized by a method of polishing a vehicle, using a portal traveling frame which straddles a vehicle to be polished and moves reciprocatingly, comprising the steps of: a washing step wherein the surface of said vehicle body is brushing-washed by rotative brushes provided on said portal traveling frame, upon the travel of said portal traveling frame in a first direction; a first polishing step wherein a foamy wax containing an anionic active agent is applied to said surface of said vehicle body by means of a first wax applicator provided on said portal traveling frame while said surface of said vehicle body is polished by said rotative brushes, upon the return travel of said portal traveling frame in a second direction opposite to said first direction; a second polishing and rinsing step wherein an aqueous wax containing a cationic active agent is applied to said surface of said vehicle body by means of a second wax applicator provided on said portal traveling frame while said surface of said vehicle body is polished again by said rotative brushes, and at the same time a pure water is applied to said surface of said vehicle body by means of a rinsing device provided on said portal traveling frame, upon the travel of said portal traveling frame in said first direction, again, whereby an excessive wax on said surface of said vehicle body is washed off; and a drying step wherein a dried air is blown on said surface of said vehicle body by means of a drier provided on said portal traveling frame, upon the return travel of said portal traveling frame in said second direction, again, whereby said surface of said vehicle body is dried.

BRIEF DESCRIPTION OF DRAWINGS

FIG. 2 is a schematic perspective view showing the piping arrangement for first and second wax applicators and rinsing device; and FIGS. 3 and 3A through FIGS. 6 and 6A are side views and plan views of a car-cleaning machine and a vehicle showing a method of the present invention.

PREFERRED EMBODIMENT OF INVENTION

Figure 1:
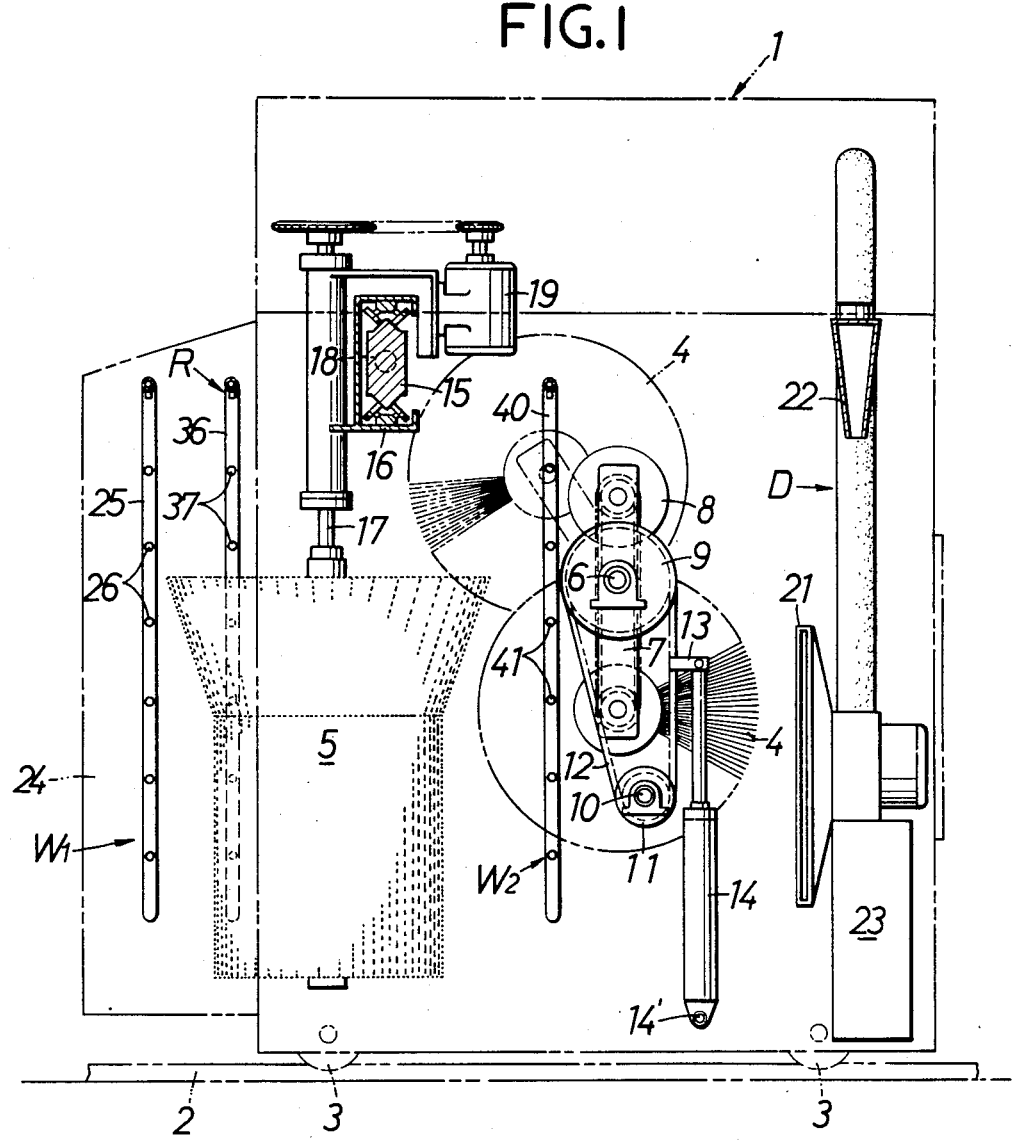
FIG. 1 is a side view of an embodiment showing a method of the present invention.

The present invention will be explained with its preferred embodiment by drawings as follows. FIG. 1 shows a schematic side view of an apparatus to be used at the present invention. In this FIG. 1, a portal traveling frame 1 is mounted on traveling rails 2 installed on ground so that it can travel through wheels pivoted thereon. On this portal traveling frame 1, upper rotative brush 4 and one pair of side rotative brushes 5, 5 are supported.

The upper rotative brush 4 is supported on a horizontal shaft 6 mounted on the portal traveling frame 1 through an oscillatory arm 7 so that it can be oscillated freely, and it is driven rotatively by a motor 8 provided on the oscillatory arm 7 through a driving mechanism within the oscillatory arm 7, and it can brushing-wash the upper surface of a vehicle body by contacting with it. A sprocket 9 is secured onto the horizontal shaft 6, and other sprocket 11 is supported on an intermediate shaft 10 secured onto the portal traveling frame 1 at the lower of the horizontal shaft 6 so that it can rotate freely, and an endless chain 12 is hung around the both sprockets 9, 11. An attaching metal fitting 13 is secured at the intermediate of the endless chain 12, and the upper end of an air cylinder 14 of which lower end being connected with the gate-type traveling frame 1 so as to be oscillatory is connected with the attaching metal fitting. Accordingly, by pressurizing the air cylinder 14, the rotative upper brush 4 can be held at its upper retracted position as shown by chain line in FIG. 1. Further, when the air cylinder is at its inoperative state, the rotative upper brush 4 can be oscillated freely back and forth of the portal traveling frame 1 around the center of the horizontal shaft 6.

At rear part of the portal traveling frame 1, the one pair of the rotative side brush 5, 5 are suspended, namely one pair of moving frames 16, 16 are engaged slidably with guide rails 15 mounted horizontally on the portal traveling frame 1, and vertical shafts 17, 17 having one pair of suspended rotative side brushes are attached on those moving frame 16, 16 and each moving frame 16 and vertical shaft 17 can be oscillated in the traveling direction of the portal traveling frame 1 around the pivot of the supporting shaft 18 of the guide rail 15. A motor 19 is supported on each moving frame 16, and the rotative side brush 5 can be rotated by the motor 19. One pair of the rotative side brushes 5, 5 are controlled so that they can be moved so as to be opened and closed along the guide rail 15, whereby the front surface, both side surfaces and rear surface of the vehicle body can be brushing-washed. Since the supporting and operating mechanisms of the rotative upper brush 4 and one pair of rotative side brushes 5, 5 are mechanisms known hitherto, its detailed description will be omitted.

At the front part of the portal traveling frame 1, a drier D is equipped, namely one pair of the side wind-blowing nozzles 21, 21 opening toward its inner side are provided at both sides of the portal traveling frame 1, and also a upper wind-blowing nozzle 22 opening toward inner side is provided on its upper face so that it can be moved vertically. These side nozzles 21, 21 and upper nozzle 22 are communicated with a blower 23 equipped at the lower end of both sides of the portal traveling frame 1. Since this drier D is also a construction known hitherto, its detailed description will be omitted.

At the outer side of the rotative side brushes 5,5 of the portal traveling frame 1, first wax applicator $W_1$ which can apply foamy wax added by anionic active agent is provided. Next, construction of this first wax applicator $W_1$ will be explained by referring mainly to FIG. 2. A portal foamy wax ejecting pipe 25 is arranged on a supporting frame 24 extended to the back of the portal traveling frame 1 across the portal traveling frame 1, and nozzles 26 having ejecting port facing toward inside of the portal traveling frame 1 are provided in spaced relation on the foamy wax ejecting pipe 25. At the intermediate of the foamy wax ejecting pipe 25, a foamy wax supply pipe 27 is connected, and this supply pipe 27 is connected with a water supply pipe 31 through an ejector 28, a pressure reducing valve, and an electromagnetic valve 30. This water supply pipe 31 is further connected with a water pump P supported on the portal traveling frame 1. An undiluted wax solution supply pipe 32 communicated with a first undiluted wax solution tank $T_1$ is connected with the ejector 28 and also an air supply pipe 33 communicated with an air tank A is connected with the ejector 28 through an electromagnetic valve 34 and a pressure reducing valve 35. Accordngly, when the electromagnetic valve 30 is opened after driving of the water pump P, the pressurized water flow into the ejector 28 through the electromagnetic valve 30 and the pressure reducing valve 29, and the undiluted wax solution is sucked in from its supply pipe 32 by ejector effect, and air is sucked in from its supply pipe 33 through the electromagnetic valve 34 and the pressure reducing valve 35, whereby the foamy wax is supplied to the foamy wax ejecting pipe 25, and it is ejected from the nozzles 26.

A rinsing device R is provided on the supporting frame 24 at the inside of the first wax applicator $W_1$. This rinsing device is constituted by the provision of nozzles 37 each having ejecting port facing toward the inner side of the portal traveling frame 1. The nozzles 37 are provided on a portal water ejecting pipe 36 arranged in parallel with the foamy wax ejecting pipe 25. The water ejecting pipe 36 is connected at the intermediate thereof with the water supply pipe 39 communicated with the water pump P through an electromagnetic valve 38, and it can eject pure water from the nozzle 37 by opening the electromagnetic valve 38.

At the portal traveling frame 1, a second wax applicator $W_2$ which can apply aqueous wax containing cationic active agent onto the vehicle body is provided between the rotative upper brush 4 and one pair of rotative side brushes 5,5. In this second wax applicator $W_2$, a portal aqueous wax ejecting pipe 40 is also arranged across the portal traveling frame 1 similarly to the first wax applicator $W_1$, and nozzles 41 having ejecting port facing toward the inner side of the portal traveling frame 1 are provided at spaced relation. An aqueous wax supply pipe 42 is connected with the intermediate of the aqueous wax ejecting pipe 40, and this supply pipe 42 is connected with a water supply pipe 45 through an ejector 43 and an electromagnetic valve 43, and this water supply pipe 45 is connected with a water pump P. An undiluted wax solution supply pipe 46 communicated with a second wax tank $T_2$ is connected with the ejector. Accordingly, when an electromagnetic valve 44 is opened after driving of the water pump P, pressurized water flows into the ejector, and here undiluted aqueous wax solution is sucked in from the undiluted wax solution supply pipe 46 by ejector effect, and aqueous wax mixed with water can be ejected out of nozzles 41.

Further, non-ionic active agent and solubilizer are may be added to foamy wax in this embodiment other than the anionic active agent, and hydrocarbonic wax and nonionic active agent are may be added to aqueous wax other than the cationic active agent.

Next, the cleaning process of a vehicle V according to the present invention will be explained by referring to FIG. 3 through FIG. 6A. The vehicle V is stopped at a prescribed location on the rails 2,2. At the left end position of the portal traveling frame 1 as shown in FIGS. 3 and 3A, the rotative upper brush 4 and one pair of the rotative side brushes 5,5 are rotated in normal direction (arrowed direction in FIGS. 3 and 3A) while holding the rotative upper brush 4 at the lowered position from its retracted position, and holding the upper wind blowing nozzle 22 at its raised position as described above. When the portal traveling frame 1 is advanced in right direction, the rotative upper brush 4 is oscillated around the horizontal shaft 6 and the upper surface of the vehicle V is brushing-washed, and one pair of the rotative side brushes 5,5 are controlled to be opened and closed along the guide rail 15, whereby the front face, both side faces and rear face are brushing-washed. Then, when the portal traveling frame 1 has reached to its right end position as shown by chain line in FIGS. 3 and 3A, brush-washing of the vehicle is finished.

Next, at the state where the portal traveling frame 1 is at its right end position as shown in FIGS. 4 and 4A, when the rotative upper brush 4 and one pair of rotative side brushes 5,5 are rotated respectively in reverse direction (arrowed direction in FIGS. 4 and 4A) and at the same time the portal traveling frame 1 is moved toward the left direction while ejecting foamy wax from the foamy wax ejecting pipe 25 of the first wax applicator $W_1$, the foamy wax is applied to the vehicle body whereby the vehicle body can be polished by the rotative upper brush 4 and one pair of the rotative side brushes 5,5 by quite same gist as the case of the brush-washing. In this case, since ejected wax is in foamy state, with even comparative small quantity of wax, whole surface of the vehicle body can be coated evenly.

When the portal traveling frame 1 has reached to its left end position as shown by chain line in FIGS. 4 and 4A, its traveling is once stopped, and at the same time, ejecting of foamy wax is stopped.

Next, the rotative upper brush 4 and one pair of the rotative side brushes 5,5 are rotated in normal direction (arrowed direction in FIGS. 5 and 5A) again, and the aqueous wax is ejected from the aqueous wax ejecting pipe 40 of the second wax applicator $W_2$, and applied on the vehicle body and at the same time pure water is ejected from the water ejecting pipe 36 of the rinsing device, and the portal traveling frame 1 is advanced again in right direction, whereupon the vehicle body coated by the aqueous wax is polished again by the normal rotation of the rotative upper brush 4 and one pair of the rotative side brushes 5,5 and at the same time the excess wax applied on the vehicle body is washed off by pure water ejected from the rinsing device R.

Figure 5:
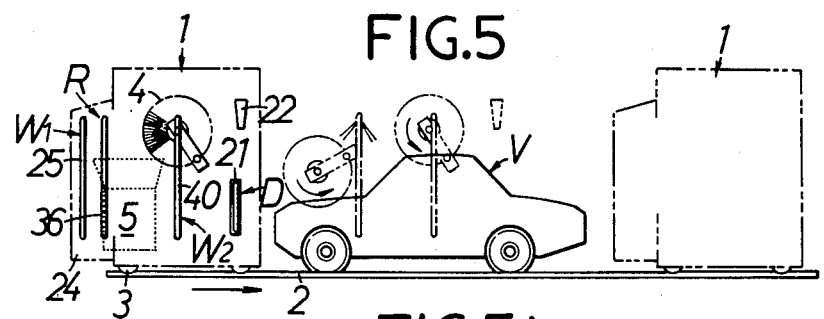
Figure 5A:
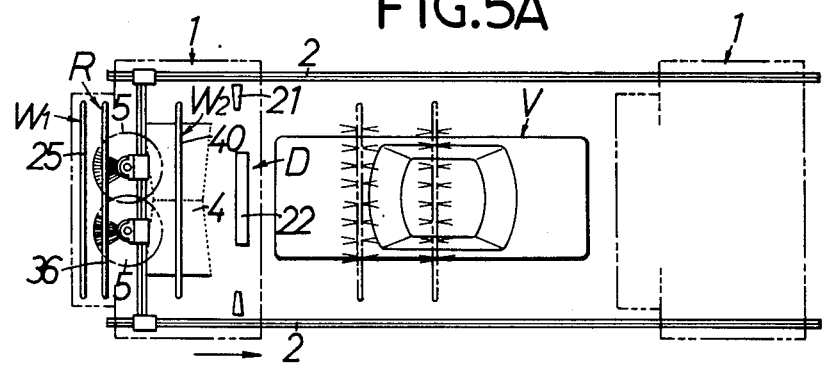

When the portal traveling frame 1 has been reached to its right end position as shown by chain line in FIGS. 5 and 5A, rotation of the rotative upper brush 4 and one pair of the rotative side brushes 5,5 is stopped, and operation of the second wax applicator $W_2$ and rinsing device R are stopped. Then the rotative upper brush 4 is sprung up to its upper retracted position and one pair of the rotative side brushes 5,5 are opened outwardly.

Figure 6:
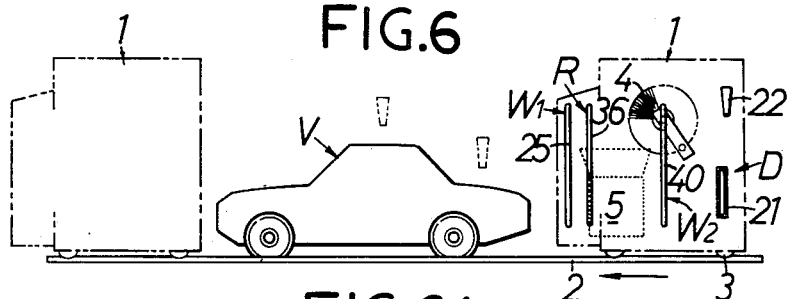
Figure 6A:
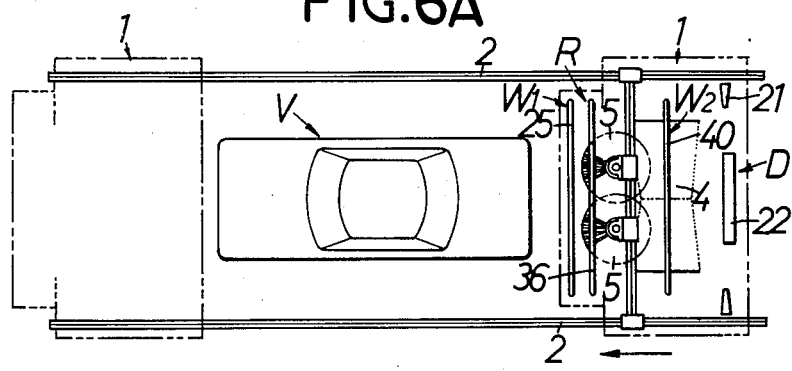

Finally, the portal traveling frame 1 positioned at its right end is moved again, and after the upper wind blowing nozzle 22 is lowered to its proper position, the wind blower 23 is driven and dried air is ejected from one pair of side wind blowing nozzles 21,21 and the upper wind blowing nozzle 22 simultaneously, whereupon the dried air is blown against the whole surface of wet vehicle body after rinsing, and water droplet on the vehicle body can be blown off or evaporated (FIGS. 6 and 6A). When the portal traveling frame 1 has reached to its left end position, the portal traveling frame 1 is stopped and the wind blower 23 is stopped, whereupon drying process of the vehicle body is finished.

Now, as described above, the process for cleaning the vehicle body, comprising the steps of polishing by foamy wax, polishing and rinsing by aqueous wax and drying is finished.

By the way, in the process described above, since anionic active agent contained in foamy wax can strengthen anionic ionization tendency of the vehicle body with formation of primary wax coating on the vehicle body by the first polishing, it can make to perform extremely easily adhesion of aqueous wax containing cationic active agent applied on the vehicle body at the next process. Moreover, in the second polishing process by aqueous wax, since aqueous wax can be rubbed on the primary wax coated on the vehicle body evenly throughout the whole surface and strongly by polishing action of the rotative brushes, the bubble in foamy wax remaining on the primary wax coating can be removed effectively, and adhesion of aqueous wax on the vehicle body, i.e. contact and bond between cationic active agent within aqueous wax and anionic active agent within the primary wax coating can be made to be performed evenly, strongly and surely throughout the whole vehicle body without using much quantity of aqueous wax, as a result, the thick wax coating can be provided on the vehicle body evenly throughout the whole body surface securely, and the wax coating can not be disappeared at short period even by exposure to rain and washing of vehicle body etc.

As described above, according to the present invention, since four steps consisting of brush-washing, first polishing by foamy wax, second polishing and rinsing by aqueous wax, and drying of the vehicle body can be performed successively without trouble by moving the portal traveling frame arranged so as to straddle the vehicle, washing of the body and subsequent wax-applying operation can be performed extremely efficiently by small reciprocative travel of the gate-type traveling frame.

Especially, in the first polishing process by foamy wax, since wax can be applied evenly on the vehicle body by comparatively small quantity of wax, it is economical without spending wax wastefully. Moreover since anionic active agent contained in foamy wax can strengthen ionization tendency on the vehicle body with formation of primary wax coating on the vehicle body by the first polishing, adhesion of aqueous wax containing cationic active agent applied on the vehicle body at subsequent process can be performed extremely easily. Moreover, in the second polishing process by aqueous wax, since the aqueous wax can be rubbed on the primary wax coating on the vehicle body evenly throughout the whole vehicle body, the bubble in foamy wax remaining on the primary wax coating can be removed effectively, and adhesion of aqueous wax on the vehicle body, i.e. contact and bond between cationic active agent within aqueous wax and anionic active agent within the primary wax coating may be performed evenly, strongly and surely throughout the whole surface of the vehicle body and without using much quantity of aqueous wax. As a result, the thick wax coating can be applied on the vehicle body evenly throughout the whole vehicle body, and the wax-finished surface having good luster can be gained, and its wax effect can be kept effectively during long period. Also the quantity of aqueous wax can be saved, thus it can contribute to reduction of cost.

Especially, after finishing of brushing-washing process, it can transfer to the primary polishing process immediately without interposing a process to remove remaining water on the vehicle body. Accordingly, efficiency of operation can be elevated, and since excess wax remaining on the vehicle body at the rinsing process by pure water subsequent to the secondary polishing process can be washed off cleanly without unevenness, the wax-finished face of the vehicle body can be made beautiful. Further, since the same rotative brushes can be used at the stages of the brushing-washing process and both polishing, processes the construction of various mechanism to drive or move the rotative brushes is simplified, and the whole construction of the device can be made simple and compact, with the results that cost can be reduced, trouble is rare, inspection and adjustment are easy, and it can be installed with a narrow space, etc. Further, in case of transfer from the brushing-washing process to the primary polishing process, since the rotative brushes are held at their operational positions without being moved to the retracted position, the transfer can be performed smoothly, and operational efficiency can be elevated still more.

What is claimed is:

1. A method of polishing a vehicle, using a portal traveling frame which straddles a vehicle to be polished and moves reciprocatingly, comprising: a washing step wherein the surface of said vehicle body is brushing-washed by one set of rotative brushes provided on said portal traveling frame, upon the travel of said portal traveling frame in a first direction; a first polishing step wherein a foamy wax containing an anionic active agent is applied to said surface of said vehicle body by means of a first wax applicator provided on said portal traveling frame while said surface of said vehicle body is polished by said rotative brushes, upon the return travel of said portal travelling frame in a second direction opposite to said first direction; a second polishing and rinsing step wherein an aqueous wax containing a cationic active agent and hydrocarbonic wax is applied to said surface of said vehicle body by means of a second wax applicator provided on said portal traveling frame simultaneously with the polshing of said surface of said vehicle body with said rotative brushes, and subsequently a pure water is applied to said surface of said vehicle body by means of a rinsing device provided on said portal traveling frame, upon the travel of said portal traveling frame in said first direction, again, whereby an excessive wax on said surface of said vehicle body is washed off; and a drying step wherein a dried air is blown on said surface of said vehicle body by means of a drier provided on said portal traveling frame, upon the return travel of said portal traveling frame in said second direction, again, whereby said surface of said vehicle body is dried.

2. A method of polishing a vehicle, as set forth in claim 1, wherein said foamy wax further contains a non-ionic active agent and solubilizer.

3. A method of polishing a vehicle, as set forth in claim 1, wherein said aqueous wax further contains non-ionic active agent.

4. A method of polishing a vehicle, as set forth in claim 1, wherein said one set of rotative brushes consist of one set of upper and side brushes.

* * * * *